United States Patent
Sugano

(10) Patent No.: US 8,721,314 B2
(45) Date of Patent: May 13, 2014

(54) NOODLE MAKER

(76) Inventor: Eiji Sugano, Hokkaido (JP)

(*) Notice: Subject to any disclaimer, the term of this patent is extended or adjusted under 35 U.S.C. 154(b) by 0 days.

(21) Appl. No.: 12/681,254

(22) PCT Filed: Oct. 29, 2009

(86) PCT No.: PCT/JP2009/005754
§ 371 (c)(1),
(2), (4) Date: Jun. 26, 2012

(87) PCT Pub. No.: WO2011/052012
PCT Pub. Date: May 5, 2011

(65) Prior Publication Data
US 2012/0258188 A1    Oct. 11, 2012

(51) Int. Cl.
*B29C 47/08* (2006.01)

(52) U.S. Cl.
USPC .... 425/192 R; 425/206; 425/207; 425/382 R; 425/464

(58) Field of Classification Search
USPC ................. 425/192 R, 206, 207, 382 R, 464
See application file for complete search history.

(56) References Cited

U.S. PATENT DOCUMENTS

| | | | |
|---|---|---|---|
| 4,219,318 A * | 8/1980 | Cavalli | 425/190 |
| 4,384,842 A * | 5/1983 | Cavalli | 425/463 |
| 4,391,575 A * | 7/1983 | Osrow | 425/190 |
| 6,485,287 B1 | 11/2002 | Sugano | |

FOREIGN PATENT DOCUMENTS

| | | |
|---|---|---|
| JP | 01312955 | 12/1989 |
| JP | 2116034 | 9/1990 |
| JP | 449909 | 11/1992 |
| JP | 08002236 | 9/1996 |
| JP | 2001037406 A | 2/2001 |
| JP | 2007236281 A | 9/2007 |

OTHER PUBLICATIONS

JP International Searching Authority (IP/JP), ISR completed Jan. 12, 2010 of corresponding PCT application (PCT/US2009/005457; Int'l. Filing Date: Oct. 29, 2009) with English translation thereof (13 pgs.).

* cited by examiner

*Primary Examiner* — Dimple Bodawala
*Assistant Examiner* — Joseph Leyson
(74) *Attorney, Agent, or Firm* — Im IP Law PLLC; C. Andrew Im

(57) ABSTRACT

In an extruder-type noodle maker comprising a casing constituted as a cylindrical body, a screw, a nozzle unit, a connector, a hopper, and a drive unit, the nozzle unit is formed with many holes tapered in the outlet direction, an inner peripheral surface of the nozzle unit is provided with multiple engaging protrusions and depressions, an end surface of the distal end periphery of the cylindrical casing is provided at corresponding locations with multiple receiving depressions and protrusions for insertion into the engaging protrusions and depressions, and the cylindrical casing is constituted by forming a proximal end section thereof positioned under the hopper of resin and forming a distal end thereof near an outlet of metal, whereby it has a structure comprising a resin portion and a metal portion joined together.

13 Claims, 4 Drawing Sheets

NOODLE MAKER

TECHNICAL FIELD

This invention relates to an extruder-type noodle maker for making spaghetti, buckwheat soba noodles, plain wheat noodles and other noodle and pasta products, in which small holes at the distal end of a nozzle unit are formed to taper in a funnel-like shape and which is notable in that the casing of the extruder-type noodle maker is made of resin and the interlocking engagement between the screw and drive unit is reinforced.

BACKGROUND ART

Noodle makers having an extruder-type structure are powered by a powerful rotary drive unit. Many therefore have a structure that comes under more pressure than necessary. Although this is because the noodle raw material must be extruded after being adequately kneaded and transformed to alpha starch (gelatinized), a palatable texture must be maintained by conducting the operation so as to avoid excessive noodle material kneading that causes an overdone condition. The pressure must therefore be controlled to prevent excessive stickiness.

Particularly in the case of kneading buckwheat flour, a somewhat powerful rotary drive unit must be installed because the amount of pressure required for kneading the flour is fairly large. It is generally agreed that 100% buckwheat soba noodles (vermicelli) made by adding water to pure buckwheat flour as the only ingredients are the best in the point of texture. However, when buckwheat soba noodles are kneaded too long they lose their flavor, and when they are not kneaded long enough, the prepared noodles break into short pieces when boiled because buckwheat is gluten-free. In the improvement of noodle makers, special attention has therefore been focused on machine preparation of 100% buckwheat soba noodles made solely from buckwheat flour.

A helical screw inside the cylindrical body of the extruder-type noodle maker kneads the noodle material consisting of buckwheat flour containing added water under pressurized rotation. A problem of inferior texture arises if the noodles become very firm. This makes it necessary to accurately control the pressurized travel period between the time the rotating screw kneading operation is completed and the time the kneaded buckwheat flour reaches the outlets of the nozzle body.

In addition, excessive kneading that gelatinizes the material starch is thought to make the buckwheat lose flavor. It has been ascertained that when noodles are made with an extruder-type noodle maker, rapid gelatinization upon reaching the vicinity of the nozzle body having the noodle maker outlets accelerates cooking.

A noodle maker has been developed that prevents excessive gelatinization by forming a helical groove in the inner wall of the screw unit to establish a pressure-relaxation structure. However, the formation of a groove inside the screw unit makes the work of cleaning the machine after use troublesome.

A need has therefore been felt for the development of a light-weight, easy-to-use noodle maker that simplifies cleaning of the casing and other parts, while also avoiding loss of buckwheat noodle flavor. The desire has been especially strong for the development of a noodle maker that enables 100% buckwheat soba noodles to be readily and simply made by machine in the home or from only a small amount of buckwheat flour, without loss of flavor or aroma, thus making it possible to enjoy delicious buckwheat soba noodles even when prepared in small quantities.

PRIOR ART DOCUMENTS

Patent Documents

Patent Document 1:
Japanese Patent Publication (A) No. 2007-236281
Patent Document 2
Japanese Patent Publication (A) No. 2001-37406

DISCLOSURE OF THE INVENTION

Problem to be Overcome by the Invention

The object of the present invention is to provide an extruder-type noodle maker that maintains the pressure in the extruder-type noodle maker while not causing loss of the buckwheat flour ingredient flavor, incorporates a nozzle body and a screw for making firm noodles, is easy to clean and use, and is improved in the sturdiness of the interlock between the drive unit and the screw.

Means for Solving the Problem

For achieving the aforesaid object, the present invention provides an extruder-type noodle maker comprising a casing constituted as a cylindrical body, a screw rotatably housed inside the cylindrical casing, a nozzle unit formed with many holes and attached to the distal end of the casing, a connector surrounding the nozzle unit and screw-attached to the distal end of the casing, a hopper for charging noodle ingredients attached to an open upper portion of the cylindrical casing, and a drive unit for rotating the screw, wherein the many holes in the nozzle unit are tapered in an outlet direction, an inner peripheral surface of the nozzle unit is provided with multiple engaging protrusions and depressions, an end surface of the distal end periphery of the cylindrical casing is provided at corresponding locations with multiple receiving depressions and protrusions for insertion into the engaging protrusions and depressions, and the cylindrical casing is constituted by forming a proximal end section thereof positioned under the hopper of resin and forming a distal end thereof near an outlet of metal, whereby it has a structure comprising a resin portion and a metal portion joined together.

The present invention also provides an extruder-type noodle maker comprising a casing constituted as a cylindrical body, a screw rotatably housed inside the cylindrical casing, a nozzle unit formed with many holes and attached to the distal end of the casing, a connector surrounding the nozzle unit and screw-attached to the distal end of the casing, a hopper for charging noodle ingredients attached to an open upper portion of the cylindrical casing, and a drive unit for rotating the screw, wherein the many holes in the nozzle unit are tapered in an outlet direction, an inner peripheral surface of the nozzle unit is provided with multiple engaging protrusions and depressions, an end surface of the distal end periphery of the cylindrical casing is provided at corresponding locations with multiple receiving depressions and protrusions for insertion into the engaging protrusions and depressions, and the cylindrical casing has a structure formed entirely of resin.

In another aspect, the extruder-type noodle maker comprises a hollow tube-like connecting cylinder interposed between the hopper and cylindrical casing for safety.

In another aspect, an interlock joint between the screw and the drive unit comprises multiple trough-like slots formed on the periphery of a shaft member of the screw and multiple ridge-like protrusions formed in a cylindrical concave portion of the drive unit in correspondence to the trough-like slots, and the trough-like slots and the ridge-like protrusions engage snugly with no gap. Moreover, the extruder-type noodle maker can have a structure wherein the nozzle unit, cylindrical casing and connector are all formed of synthetic resin.

Effects of the Invention

The extruder-type noodle maker configured in accordance with the present invention offers the following advantageous effects:

1. The weight of the noodle maker can be made lighter and cleaning of then casing interior be conducted more readily than in the case of the conventional heavy metal machine. The rotary friction between the cylindrical casing and the screw inside enable suitable pressure regulation without providing a pressure regulation groove in the casing, while noodle output is smooth. The provision of the engaging protrusions and depressions inside the nozzle unit and the engaging protrusions and depressions at the corresponding locations of the cylindrical casing make it possible to maintain robust fixation and to easily and stably prepare savory 100% buckwheat soba noodles.

2. Being made of resin, the cylindrical casing is easy to mold, sanitary and simple to clean. Moreover, the formation of the small holes in the nozzle unit so as to taper toward the outlets in a funnel-like shape produces a suitable pressure reduction that makes it possible to prepare good-textured 100% buckwheat soba noodles with ease.

3. The connecting cylinder establishes a safe structure that prevents accidental catching of the hand in the hopper. In addition, the hopper inserted into the connecting cylinder is solidly fixed to provide a structure that enables easy charging of ingredients and is also resistant to vibration during operation.

4. The screw and drive unit are firmly connected by the interlock joint, so that screw shaft wobble can be avoided to enable stable rotation and uniform application of pressure to the ingredients, thereby enabling suitable kneading that makes it possible to prepare firm buckwheat soba noodles of excellent texture.

5. The overall weight of the machine is markedly reduced while still enabling stable application of the prescribed pressure suitable for 100% buckwheat soba noodles from the cylindrical casing to the nozzle unit, thereby making it possible to easily prepare good-textured 100% buckwheat soba noodles of uniform length and fine aroma.

BEST MODE FOR WORKING THE INVENTION

Figure 1:
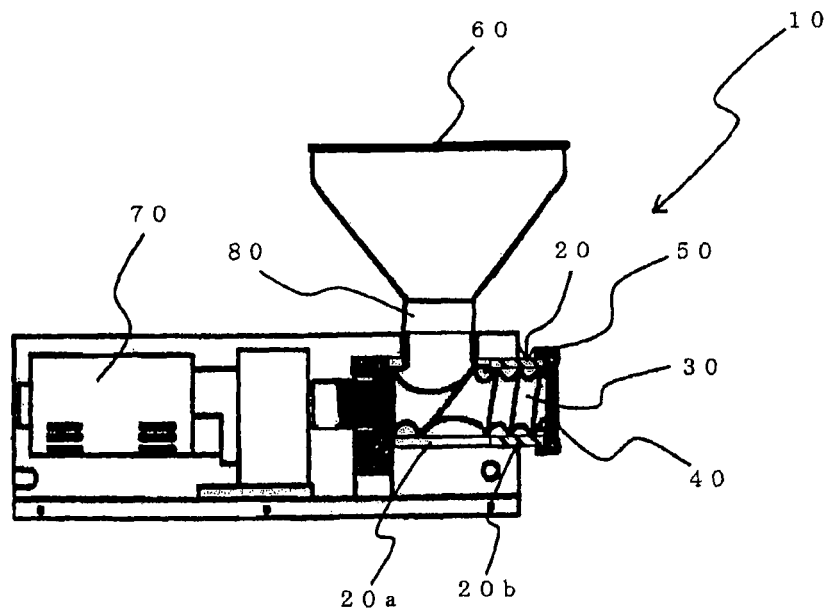
FIG. 1 is a partially cut-away front view of an extruder-type noodle maker according to the present invention.

As shown in FIG. 1, the extruder-type noodle maker 10 of the present invention comprises a casing 20, screw 30, nozzle unit 40, connector 50, hopper 60, drive unit 70, and connecting cylinder 80.

The casing 20 is a cylindrical body that internally accommodates the helical screw 30 to be rotatable therein. A proximal end section 20a of the casing 20 located under the hopper as illustrated in FIG. 1 is formed of resin, and a distal end section 20b thereof located toward the outlet is formed of metal. The cylindrical casing 20 of this embodiment is formed unitarily with an upper connecting cylinder 80. The resin portion and metal portion are connected together, and the pressure applied to knead the ingredients is adjusted by varying the friction in the region extending from the bottom of the hopper to the outlet, thereby releasing excess moisture produced by the application of pressure.

Alternatively, the casing 20 can be formed totally of resin. A casing 20 formed entirely of resin helps to reduce the weight of the noodle maker and also facilitates cleaning. In addition, a helical groove 22 can be optionally provided in the inner surface of the casing 20 in a region near the outlet in order to relieve and regulate pressure so as to ensure preparation of good-tasting buckwheat soba noodles. Considerably high kneading pressure is required to make 100% buckwheat soba noodles without degrading their flavor or texture. Weight reduction of the noodle maker for such noodles has therefore been particularly difficult owing to the need for a heavy drive unit 70. However, the improved structure of the kneading zone and outlet region offered by the present invention provides a light-weight noodle maker capable of simple 100% buckwheat soba noodle preparation.

The expedient conventionally adopted for regulating the pressure applied to the buckwheat flour constituting the main ingredient has been to form a helical groove in the inner wall of the screw casing. In the present invention, however, the formation of the casing 20 of resin, or of resin and metal sections connected in tandem, provides a structure that regulates the pressure produced by friction with the screw 30 to apply pressure suitable for 100% buckwheat soba noodles inside the casing 20. The conventionally required groove is therefore not necessary.

As shown in FIG. 1, the screw 30 is helical and is rotated by the drive unit 70 to knead the ingredients. When the helical groove 22 for pressure relaxation is formed in the inner wall of the cylindrical casing 20 near the outlet, it is preferable for ensuring efficient and continuous pressure relief to form the helical groove 22 as a helix of opposite handedness from that of the screw 30 so that the two helices intersect. Provision of straight grooves running in the longitudinal direction of the casing 20 is also possible.

The nozzle unit 40 is a disk formed with many small holes 42 that is attached to the distal end of the casing 20. The many small holes 42 provided in the nozzle unit 40 of the present invention are formed to taper in the outlet direction. The nozzle unit 40 is attached to the casing 20 of the extruder-type noodle maker 10 by screwing the connector 50 onto the distal end of the casing 20.

In the present invention, since the tapered small holes 42 have wide openings on the inlet side, the kneaded ingredients enter the small holes 42 smoothly, are further pushed toward the outlets to be continuously and smoothly extruded without application of further pressure, and made into soft, string-like noodles (vermicelli) shaped to the form of the small holes 42. The noodles imparted with string-like shape by the extrusion are received on a tray or other such thin plate in that form, whereafter they are allowed to stand for several minutes to suitably adjust their moisture content, thereby completing the preparation of buckwheat soba noodles (vermicelli).

Figure 2A:
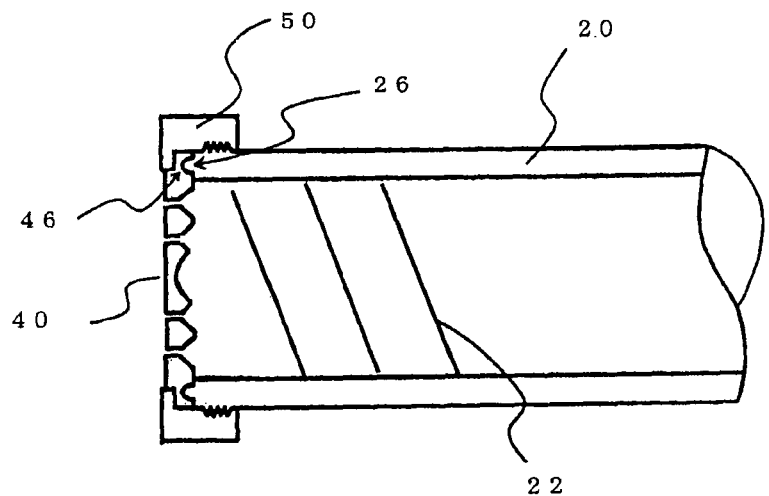
FIG. 2a is a sectional view showing the engaged state of the cylindrical casing and nozzles of the extruder-type noodle maker according to the present invention.

The nozzle unit 40 is attached by screwing the connector 50 onto the cylindrical casing 20. In this embodiment, as shown in FIG. 2a, the connector 50, with the nozzle unit 40 enclosed thereby, is fixed in place by screwing it onto the distal end periphery of the cylindrical casing 20. The configuration of the connector 50 is not limited to that just described, and the connector 50 can be of any structure capable of ensuring firm attachment safe from spontaneous detachment of the nozzle unit 40 under the pressure produced by rotation of the screw 30.

Figure 3:
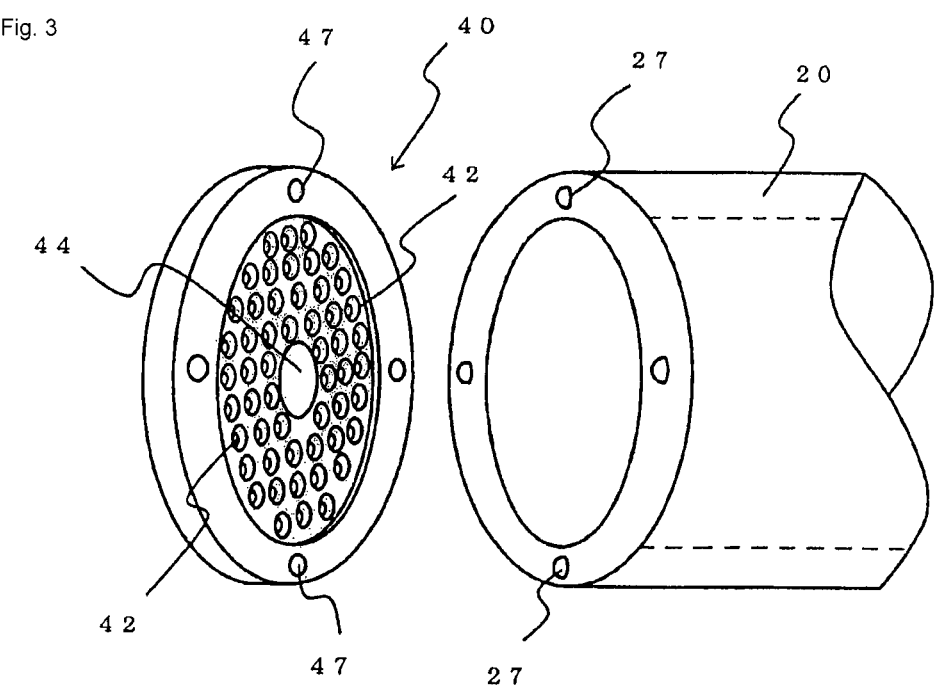
FIG. 3 is a perspective view of the distal end peripheral surface of the cylindrical casing and the inside of the nozzle unit.

The nozzle unit 40 is provided at the periphery of its inner surface with multiple engaging protrusions and depressions 46. When the nozzle unit 40 is attached, the engaging protrusions and depressions 46 mate with receiving depressions and protrusions 26 provided at corresponding locations on the end surface of the distal end periphery of the cylindrical casing. FIG. 3 shows an embodiment structured so that engaging protrusions 27 of the cylindrical casing 20 fit into receiving depressions 47 of the nozzle unit 40. Alternatively, the engaging protrusions can be provided on the nozzle unit and the receiving depressions on the cylindrical casing, and this or any other structure suffices insofar as it ensures that the nozzle unit 40 and casing 20 are reliably joined to prevent shifting caused by rotation of the screw 30 and vibration of the extruder-type noodle maker 10

Figure 2B:
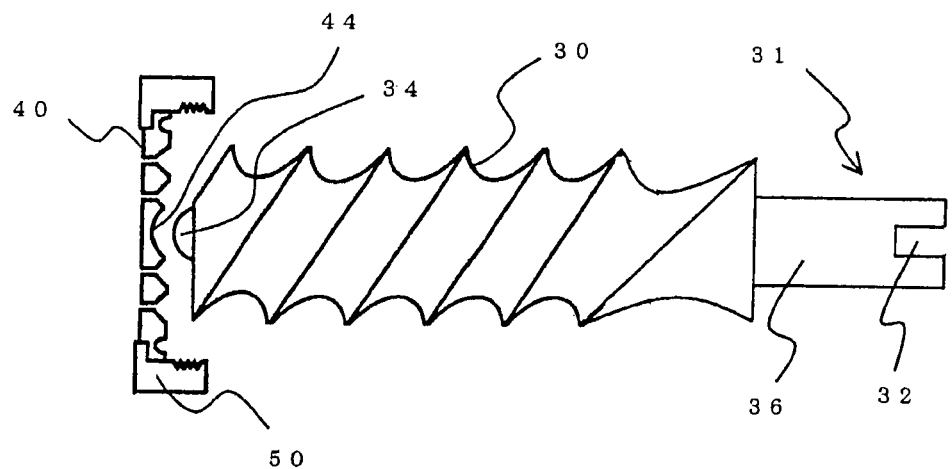
FIG. 2b is a sectional view showing the engaged state of the nozzle unit and screw of the extruder-type noodle maker according to the present invention.

Moreover, as shown in FIG. 2b, a depression 44 is provided at the center of the inner side of the nozzle unit 40 and a protrusion 34 that mates with the depression 44 is provided on the end of the center shaft of the screw 30 that faces the nozzle unit 40. Since the mating of the protrusion 34 with the depression 44 keeps the shaft of the screw 30 from shifting, this structure enables uniform kneading by application of uniform pressure to the ingredients.

The nozzle unit 40 of this embodiment can be made entirely of synthetic resin. Although conventionally the nozzle unit 40 would be hard to clean owing to ready adhesion of ingredients in the course of extruder-type noodle maker 10 operation, the fact that it is formed of resin makes it both light of weight and easy to clean. Moreover, the use of the nozzle unit 40 made of resin enhances friction with the cylindrical casing 20, thereby making it possible to achieve pressure regulation during noodle making without providing a helical groove inside the casing 20.

In the present invention, the small holes 42 of the nozzle unit 40 are tapered, the attachment to the casing 20 is robust, and, if necessary, pressure regulation is facilitated by forming a helical groove inside the casing. Therefore, even in the case of forming the nozzle unit 40 of resin, it is nevertheless possible to maintain suitable pressure regulation performance and make buckwheat soba noodles of excellent texture.

In another embodiment of the extruder-type noodle maker 10 according to the present invention, the casing 20, nozzle unit 40 and connector 50 are all made entirely of synthetic resin. The use of these components made solely of resin greatly reduces weight, facilitates overall cleaning, lowers cost, and renders the noodle maker convenient for use in the home.

The hopper 60 for charging the noodle starting ingredients is mounted on an opening of the cylindrical casing 20.

As shown in FIG. 1, a connecting cylinder 80 formed as a hollow tube-like cylinder is provided between the cylindrical casing 20 and the hopper 60. The provision of the connecting cylinder 80 makes it possible to push material remaining in the hopper 60 into the cylindrical casing 20 safely with a rod. In the conventional extruder-type noodle maker structure, it is possible during operation for the operator to extend his or her hand through the hopper to as far as the rotating screw when charging materials into the hopper, posing a risk of the hand being caught in the screw. The provision of the connecting cylinder 80 eliminates this danger and improves safety during machine operation.

It is also possible to form the connecting cylinder 80 integrally with the hopper 60 or the casing 20. Moreover, the connecting cylinder 80 can be made of synthetic resin, thereby providing a noodle maker whose overall weight including the connecting cylinder 80 is reduced, that is easy to clean, and that offers a convenient way to enjoy 100% buckwheat soba noodles even in the home.

The drive unit 70 produces the power for rotating the screw 30. In this embodiment, the drive unit 70 and the screw 30 are firmly joined by an interlock joint 31 composed of ridge-like protrusions 72 and trough-like slots 32 that fit tightly together with no intervening gap. Owing to this arrangement, the screw 30 is driven smoothly without jerking to apply the prescribed pressure.

Figure 4A:
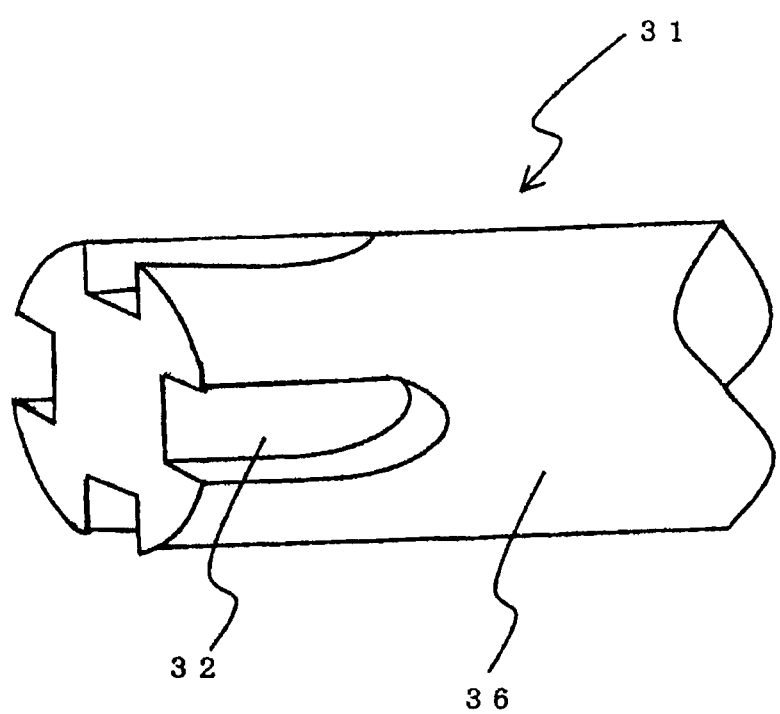
FIG. 4a is a perspective view showing trough-like slots formed in the shaft member of the screw of the extruder-type noodle maker according to the present invention.
Figure 4B:
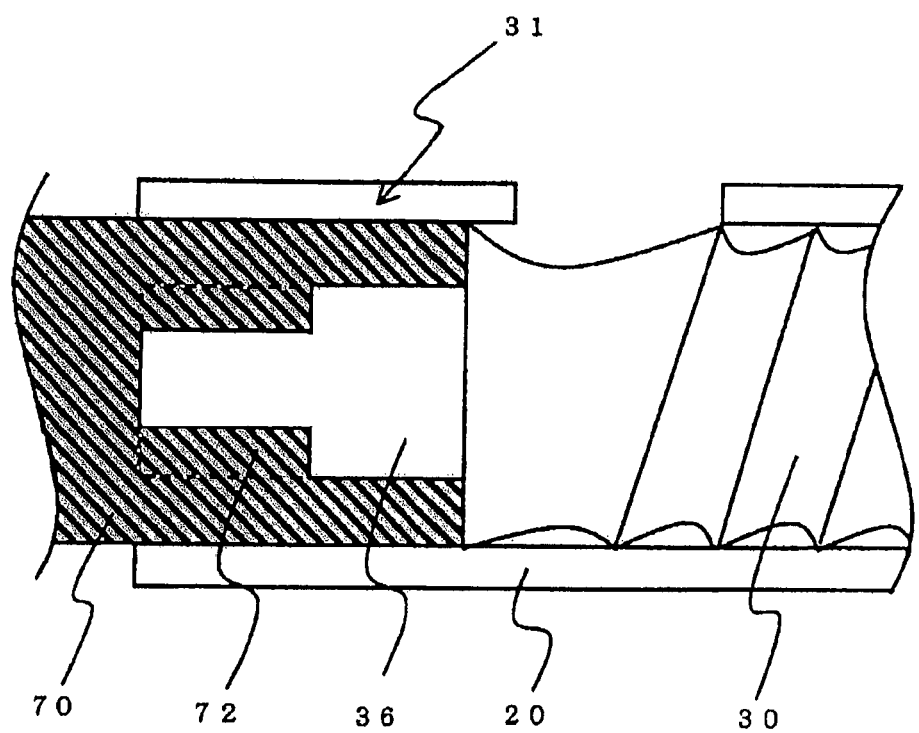
FIG. 4b is a sectional view showing an interlock joint of the screw and drive unit of the extruder-type noodle maker according to the present invention.

In this embodiment, as shown in FIGS. 4a and 4b, the proximal end of the screw 30 is formed on the periphery of its shaft member 36 with multiple trough-like slots 32 constituting the driven side of the interlock joint 31. Further, the driving side of the interlock joint 31 associated with the drive unit 70 is formed at corresponding locations with multiple ridge-like protrusions 72 of complementary shape. The interlock joint 31 connecting the drive unit 70 and screw 30 is made of high-strength, high-durability metal.

During noodle making, the drive unit 70 is operated to rotate the screw 30 rotatably accommodated inside the cylindrical casing 20. The noodle material, namely buckwheat flour mixed with water, is dumped into the hopper 60, from where it passes into the casing 20 to be forced toward the nozzle unit 40 by the screw 30 while being rotated under pressure. The extruder-type noodle maker 10 according to this embodiment can make 100% buckwheat soba noodles solely from buckwheat flour and water and does not require the addition of a tsunagi (wheat flour or other source of gluten). The ingredients can be thoroughly kneaded and blended by the screw 30 inside the cylindrical casing 20. The kneaded material continues to be transported forward by the helical screw to be formed into string-like noodles (vermicelli) by extrusion through the small holes 42 of the nozzle unit 40 at the distal end of the casing 20.

The so-formed soba noodles consist solely of buckwheat flour. As the prepared noodles do not easily sever even when boiled, they are very easy to handle during the boiling process. The noodles have a moisture content of around 38 to 45%, so do not require dusting flour or stick together, which is a big advantage. The fact that the noodles are made solely of buckwheat flour means that the broth remaining after boiling also contains only buckwheat ingredients, making it possible to obtain pure buckwheat broth containing absolutely no tsunagi.

Although the extruder-type noodle maker according to the present invention was developed primarily for the purpose of producing buckwheat soba noodles that require particular care to preserve their delicate flavor nuances, it can also obviously be used to make other kinds of noodles and pasta. Specifically, the extruder-type noodle maker according to the present invention can be utilized to make a broad range of doughy foods including spaghetti and other pastas, ramen noodles, and thick Japanese style udon noodles.

EXPLANATION OF SYMBOLS

10 . . . extruder-type noodle maker, 20 . . . cylindrical casing, 20a . . . proximal end section, 20b . . . distal end section, 22 . . . helical groove, 26 . . . receiving depressions and protrusions, 27 . . . engaging protrusions, 30 . . . screw, 31 . . . interlock joint, 32 . . . trough-like slots, 34 . . . protrusion, 36 . . . shaft member, 40 . . . nozzle unit, 42 . . . small holes, 44 . . . depression, 46 . . . engaging protrusions and depressions, 47 . . . receiving depressions, 50 connector, 60 . . . hopper, 70 drive unit, 72 . . . ridge-like protrusions, 80 . . . connecting cylinder.

The invention claimed is:

1. A noodle maker comprising a casing having a cylindrical body, a screw rotatably housed inside the cylindrical casing, a nozzle unit formed with many holes and attached to the distal end of the casing, a connector surrounding the nozzle unit and screwed onto the distal end of the casing, a hopper for charging noodle ingredients, the hopper attached to an open upper portion of the cylindrical casing, and a drive unit for rotating the screw, wherein:

the many holes in the nozzle unit are tapered in an outlet direction, an inner peripheral surface of the nozzle unit is formed in a plane that is perpendicular to a cylindrical axis of the cylindrical casing and faces in a direction opposite to the outlet direction, the inner peripheral surface is provided with multiple engaging protrusions and depressions extending in a direction perpendicular to the inner peripheral surface, a peripheral end surface of the distal end of the cylindrical casing is formed in a plane that is perpendicular to the cylindrical axis of the cylindrical casing and faces the inner peripheral surface of the nozzle unit, the peripheral end surface is provided at corresponding locations with multiple receiving depressions and protrusions extending in a direction perpendicular to the peripheral end surface for insertion into the engaging protrusions and depressions; and the cylindrical casing is constituted by forming a proximal end section thereof positioned under the hopper of resin and forming a distal end thereof near an outlet of metal, whereby it has a structure comprising a resin portion and a metal portion joined together.

2. A noodle maker comprising a casing having a cylindrical body, a screw rotatably housed inside the cylindrical casing, a nozzle unit formed with many holes and attached to the distal end of the casing, a connector surrounding the nozzle unit and screwed onto the distal end of the casing, a hopper for charging noodle ingredients, the hopper attached to an open upper portion of the cylindrical casing, and a drive unit for rotating the screw, wherein:

the many holes in the nozzle unit are tapered in an outlet direction, an inner peripheral surface of the nozzle unit is formed in a plane that is perpendicular to a cylindrical axis of the cylindrical casing and faces in a direction opposite to the outlet direction, the inner peripheral surface is provided with multiple engaging protrusions and depressions extending in a direction perpendicular to the inner peripheral surface, a peripheral end surface of the distal end of the cylindrical casing is formed in a plane that is perpendicular to the cylindrical axis of the cylindrical casing and faces the inner peripheral surface of the nozzle unit, the peripheral end surface is provided at corresponding locations with multiple receiving depressions and protrusions extending in a direction perpendicular to the peripheral end surface for insertion into the engaging protrusions and depressions; and the cylindrical casing has a structure formed entirely of resin.

3. The noodle maker according to claim 1, further comprising a hollow tube-like connection cylinder interposed between the hopper and cylindrical casing for safety.

4. The noodle maker according to claim 1, wherein an interlock joint between the screw and the drive unit comprises multiple trough-like slots formed on the periphery of a shaft member of the screw and multiple ridge-like protrusions formed in a cylindrical concave portion of the drive unit in correspondence to the trough-like slots, and the trough-like slots and the ridge-like protrusions engage snugly with no gap.

5. The noodle maker according to claim 1, wherein the nozzle unit, and connector are all formed of synthetic resin.

6. The noodle maker according to claim 2, further comprising a hollow tube-like connection cylinder interposed between the hopper and cylindrical casing for safety.

7. The noodle maker according to claim 2, wherein an interlock joint between the screw and the drive unit comprises multiple trough-like slots formed on the periphery of a shaft member of the screw and multiple ridge-like protrusions formed in a cylindrical concave portion of the drive unit in correspondence to the trough-like slots, and the trough-like slots and the ridge-like protrusions engage snugly with no gap.

8. The noodle maker according to claim 3, wherein an interlock joint between the screw and the drive unit comprises multiple trough-like slots formed on the periphery of a shaft member of the screw and multiple ridge-like protrusions formed in a cylindrical concave portion of the drive unit in correspondence to the trough-like slots, and the trough-like slots and the ridge-like protrusions engage snugly with no gap.

9. The noodle maker according to claim 2, wherein the nozzle unit, cylindrical casing, and connector are all formed of synthetic resin.

10. The noodle maker according to claim 3, wherein the nozzle unit, and connector are all formed of synthetic resin.

11. The noodle maker according to claim 4, wherein the nozzle unit, and connector are all formed of synthetic resin.

12. The noodle maker according to claim 1, wherein the nozzle unit comprises a nozzle depression in the center of the nozzle unit facing in a direction opposite the outlet direction, and wherein the screw comprises a screw protrusion on the end of a center shaft of the screw, the screw protrusion facing the nozzle unit for mating with the nozzle depression.

13. The noodle maker according to claim 2, wherein the nozzle unit comprises a nozzle depression in the center of the nozzle unit facing in a direction opposite the outlet direction, and wherein the screw comprises a screw protrusion on the end of a center shaft of the screw, the screw protrusion facing the nozzle unit for mating with the nozzle depression.

* * * * *